United States Patent [19]
Roberti et al.

[11] Patent Number: 5,898,287
[45] Date of Patent: Apr. 27, 1999

[54] SLIP CONTROLLED INDUCTION MOTOR USING VARIABLE FREQUENCY TRANSDUCER AND METHOD FOR CONTROLLING SLIP

[75] Inventors: Joseph M. Roberti, Lake Forest; Vincent V. Roberti, Northbrook, both of Ill.

[73] Assignee: Technicore, Inc., Skokie, Ill.

[21] Appl. No.: 08/899,074

[22] Filed: Jul. 23, 1997

[51] Int. Cl.$^6$ .................................................. H02P 7/66
[52] U.S. Cl. ........................ 318/605; 318/778; 318/809; 318/661
[58] Field of Search .................................... 318/602, 605, 318/727, 778, 798, 799, 807, 809, 830, 831, 437, 653, 656, 661

[56] References Cited

U.S. PATENT DOCUMENTS

| | | | |
|---|---|---|---|
| 3,569,782 | 3/1971 | Salihi et al. | 317/6 |
| 3,600,692 | 8/1971 | McGee | 328/134 |
| 3,614,577 | 10/1971 | Honeywell et al. | 318/654 |
| 3,763,413 | 10/1973 | Wattenbarger . | |
| 4,310,790 | 1/1982 | Mulet-Marquis | 318/608 |
| 4,330,741 | 5/1982 | Nagase et al. | 318/803 |
| 4,357,569 | 11/1982 | Iwakane et al. | 318/721 |
| 4,612,486 | 9/1986 | Ban et al. | 318/254 |
| 4,935,686 | 6/1990 | Stacy | 318/801 |
| 5,066,899 | 11/1991 | Nashiki | 318/807 |
| 5,200,675 | 4/1993 | Woo | 318/254 |
| 5,293,445 | 3/1994 | Carobolante | 388/813 |

*Primary Examiner*—Bentsu Ro
*Attorney, Agent, or Firm*—Laff, Whitesel, Conte & Saret, Ltd.

[57] ABSTRACT

A slip controlled induction motor using a variable frequency feedback transducer comprises a motor stator, a motor rotor and a variable frequency feedback transducer (VFFT). The VFFT includes an input winding transformer coupled to an output winding by a VFFT rotor. The VFFT rotor is operably connected to the motor rotor so as to rotate with the motor rotor at the same angular velocity. The input winding is excited with an input AC voltage of predetermine frequency. The transformer coupling combines the predetermined frequency AC input with the signal produced by the VFFT rotor to produce a variable frequency signal in the output winding which is fed as an input to the motor stator. Since the stator input is tied to the motor rotor angular velocity, the stator input will always have a constant absolute frequency difference with the motor rotor.

18 Claims, 1 Drawing Sheet

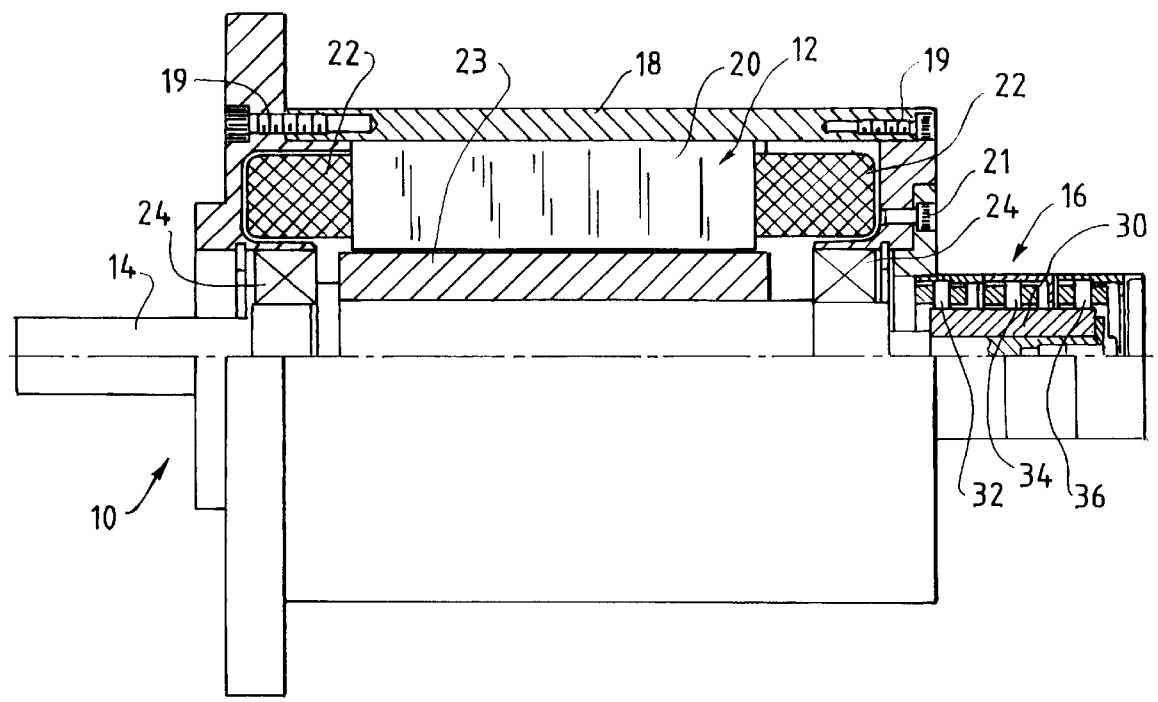
FIG. 1
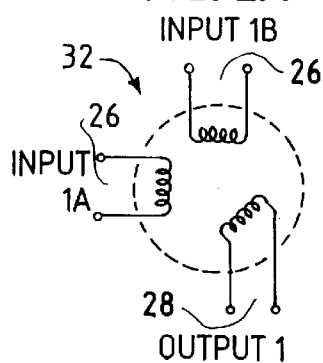
FIG. 2A
INPUT 1B
INPUT 1A
OUTPUT 1
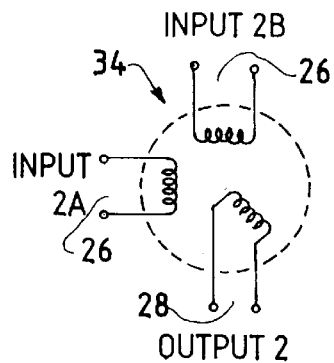
FIG. 2B
INPUT 2B
INPUT 2A
OUTPUT 2
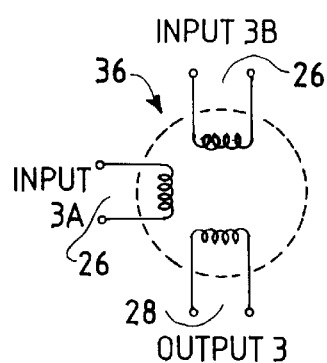
FIG. 2C
INPUT 3B
INPUT 3A
OUTPUT 3
FIG. 3
| VFFT ELEMENT | | INPUT | | OUTPUT |
|---|---|---|---|---|
| 32 | 1A | $f_{HZ}, \angle 0°$ | 1 | $f_{VAR}, \angle 0°$ |
| | 1B | $f_{HZ}, \angle 90°$ | | |
| 34 | 2A | $f_{HZ}, \angle 0°$ | 2 | $f_{VAR}, \angle 120°$ |
| | 2B | $f_{HZ}, \angle 90°$ | | |
| 36 | 3A | $f_{HZ}, \angle 0°$ | 3 | $f_{VAR}, \angle 240°$ |
| | 3B | $f_{HZ}, \angle 90°$ | | |
VFFT PHASING

SLIP CONTROLLED INDUCTION MOTOR USING VARIABLE FREQUENCY TRANSDUCER AND METHOD FOR CONTROLLING SLIP

FIELD OF THE INVENTION

The present invention relates to AC induction motors. More particularly, the present invention relates to slip controlled AC induction motors including variable frequency feedback transducers for controlling the slip of the motor.

BACKGROUND OF THE INVENTION

Induction motors consist generally of a stator and a rotor, both made of ferromagnetic material of high permeability. A set of coils embedded in the stator is fed by multi-phase currents to produce a rotating magnetic field. Depending on the geometric layout of the coils and on the current in them, different configurations of the magnetic field in the motor may be produced. Because of Faraday's law, the stator magnetic field causes an EMF to be induced on the rotor which generates current in the rotor. This current interacts with the magnetic field and produces a torque that rotates the rotor.

As long as the rotor is rotating at a speed lower than the rotation speed of the magnetic field, the induced EMF is always there to produce current and torque. However, if the rotor catches up with the rotating magnetic field, the relative motion between the field and rotor and the induced EMF disappear and no force is produced. Consequently, without the applied force, the rotor slows down.

In order to prevent situations where the rotor catches up to the rotating magnetic field, the rotor is typically configured to rotate at a speed slightly less than the speed of the rotating magnetic field. The difference between the magnetic field speed and rotor speed is typically called slip. For example, an AC induction motor having a standard 120 v, 60 Hz, 3-phase constant AC input generally produces a magnetic field rotating at 1800 RPM. In this situation, the rotor is typically configured to run at about 1725 RPM when no load is applied to the rotor. Therefore, the no-load slip is 1800 RPM–1725 RPM or 75 RPM. However, if a load is applied to the motor rotor, the rotational speed of the rotor will slow down thus increasing the slip.

A motor is running most efficiently when the slip is relatively small. Thus, it is desirable to provide a slip control means for controlling the slip and maximizing the motor's efficiency. One way to provide slip control is to control the magnetic field rotational speed by providing a variable frequency input to the motor stator. In this situation, the frequency of the variable frequency input is typically called the slip control frequency.

Prior to the development of the present invention, variable frequency control was typically accomplished by using transducers to relate the rotor position to an electronic controller which in turn calculates the specific vector functions and supplies variable frequency motor currents based on each specific motor design. The electronic controllers of the prior art are complex and can become unreliable due to their complexity. Furthermore, existing electronic controllers must be modified for each motor to accommodate different motor performance characteristics.

U.S. Pat. No. 3,614,577 issued to Honeywell et al. discloses a synchro-servo system in which motor torque is transmitted directly from the motor to the synchro rotor without interposed gearing. A synchro and a servomotor in a common housing share a common shaft. When an input from a synchro transmitter causes a magnetic field to be produced by a Y-connected synchro input winding, a current is generated in the synchro secondary winding. This current is amplified by an amplifier and fed to a control phase winding of the servomotor. The resultant torque produced by the servomotor rotates the rotor shaft to a new null position.

U.S. Pat. No. 3,569,782 issued to Shalihi et al. discloses a system having a disk of nonmagnetic material that includes a number of ferrite bars radially aligned in pairs. The disk is coupled to the rotor shaft of an AC induction motor to be controlled. A second disk is mounted in proximity to the first disk and is provided with multiple sets of imbedded C-shaped ferromagnetic elements. A step-transformer is mounted on an insulative bobbin by an auxiliary speed-controlled motor.

As the ferrite elements periodically align with one another, as a result of relative disk rotation, the reluctance of the magnetic field of an interposed coil changes periodically and results in amplitude modulation of a carrier signal applied to the coil primary by an oscillator. The frequency of this modulation is proportional to the sum (or difference) of the speeds of the two disks.

In effect, the auxiliary motor is a slip-frequency determining motor that controls the slip frequency of an induction motor. The rotor speed derived from the first disk is converted to a rotor frequency, the slip frequency is combined to provide the synchronous frequency, and this frequency is multiplied to provide the frequency of pulses required by the inverter.

U.S. Pat. No. 3,600,692 issued to McGee discloses a system designed to control motion of machine tool elements in numerical control systems. In the preferred embodiment, a sine/cosine resolver is used to provide instantaneous position information in the form of a single sinusoidal reference wave. A phase discriminator derives a final DC signal for driving a servoamplifier and servomotor that properly positions the machine tool element.

U.S. Pat. No. 4,330,741 issued to Nagase et al. discloses a field oriented control apparatus for an induction motor in which the exciting current and the secondary current are independently controlled to control the amplitude, frequency, and phase angle of the primary current in order to adjust motor torque. In the control apparatus, changes in secondary resistance are detected based upon deviation in the output of a primary voltage setter and a primary voltage detector, and the slip frequency is corrected based upon these deviation values. Thus, primary voltage and torque of the induction motor can be controlled without being unduly influenced by changes in secondary resistance.

U.S. Pat. No. 4,357,569 issued to Iwakane et al. discloses a vector controller for an AC induction motor designed to provide a torque equivalent to that of a DC motor by controlling the instantaneous values of stator current in the AC motor. Signals from a brushless position detector designed for high temperature operation (such as a resolver or a pulse generator coupled to the AC motor) are used to generate instruction signals for the stator current, and are also used to derive rotational position and speed feedback signals for precise servo control.

In one embodiment, the patent describes the derivation of a current instruction signal and a position signal by subjecting the resolver output signal to frequency division, and the derivation of a speed feedback signal through frequency-to-voltage conversion of the resolver signal, such that AC frequency and current supplied to the synchronous motor are controlled by these three signals.

U.S. Pat. No. 5,066,899 issued to Nashiki discloses a vector controller for an induction motor in which the vector controller comprises a secondary current detection unit designed to detect secondary current signals from the induction motor and a slip compensation unit that determines a slip frequency compensation value based upon the secondary current detection unit. A slip frequency generating unit determines slip frequency from the secondary current command. The field speed command for the induction motor is then based upon the slip frequency compensation value, the slip speed, and the motor velocity.

U.S. Pat. No. 5,293,445 issued to Carbolante discloses a phase-locked loop (PLL) motor control system having a variable gain such that a relatively low gain is applied when the phase error between the reference frequency and the variable frequency (the motor speed) is relatively large, such as during convergence. As the phase error decreases, such as when lock is imminent, the gain value is increased.

While the above-mentioned devices may work for their intended purposes, none of these devices accomplish slip control through use of a variable frequency feedback transducer wholly within the motor without the need for additional electronic control circuitry used to calculate field vectors and compute frequencies for slip control. It is thus apparent that there is a need for an improved method and apparatus for modulating the slip control frequency.

An object of the present invention is to provide a variable frequency feedback transducer which can be contained within the motor to automatically maintain a constant frequency difference between the rotor frequency and the magnetic field frequency.

SUMMARY OF INVENTION

According to the present invention, the foregoing and other objects and advantages are attained by a variable frequency feedback transducer (VFFT) comprising: 1) an input winding which is excited by an AC input voltage of predetermined frequency, 2) a transducer rotor operably connected to the motor rotor so that the transducer rotor rotates with the motor rotor and 3) an output winding coupled to the input winding. The output winding provides current to the motor stator creating a rotating magnetic. The rotating magnetic field induces current in the motor rotor causing a torque to be applied onto the motor rotor which rotates the motor rotor in an initial direction.

The transducer rotor creates a transformer coupling from the input winding to the output winding. In the preferred embodiment, the transducer rotor is a brushless rotor constructed of ferromagnetic material, the input winding is a 2-phase winding and the output winding is a 2- or 3-phase winding. The output from the output winding is amplified, and in turn supplies power to the motor stator winding.

The phase relationship between the AC input voltage and the initial direction of rotation of the motor rotor creates an additive or subtractive frequency change in the output winding with respect to the input winding to maintain a constant frequency difference between the motor rotor and magnetic field frequencies. This variable frequency will always maintain a constant absolute frequency difference with the motor rotor since the transducer rotor is coupled directly to the motor rotor.

If the frequency of the VFFT output is higher than the rotor, the torque generated will be in one direction (either clockwise or counterclockwise), and if the VFFT output is lower, the torque generated will be in the opposite direction. The torque direction is determined regardless of the direction of rotor rotation, thus the motor acceleration is controlled by the VFFT input phase relationship. Additionally, the VFFT input frequency can be varied, causing a change in the frequency difference between the motor rotor and field, and allowing adjustment of motor design for peak efficiency or optimization of other parameters.

These as well as other novel advantages, details, embodiments, features and objects of the present invention will be apparent to those skilled in the art from the following detailed description of the invention, the attached claims and accompanying drawings, listed hereinbelow, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which:

FIG. 1 is a partial sectional view of an AC induction motor with a variable frequency feedback transducer according to the present invention;

FIGS. 2A, 2B and 2C are schematic diagrams of the winding elements of the variable frequency feedback transducer of FIG. 1;

FIG. 3 is a table illustrating the input and output characteristics of the winding elements of FIGS. 2A, 2B and 2C.

DETAILED DESCRIPTION OF THE INVENTION

For a better understanding of the present invention, reference may be had to the following detailed description taken in conjunction with the accompanying drawings. Each reference numeral is consistent throughout all of the drawings.

Referring now to the drawings, an AC induction motor, indicated generally at 10, comprises a wound stator 12, a rotor 14 and a multi-phase variable frequency feedback transducer (VFFT) 16 housed inside a hollow motor case 18. Mounting sinks 19 are included for receiving mounting screws (not shown) for mounting motor 10 onto a structure.

Stator 12 includes a laminated stack assembly 20 and internal windings 22. Laminated stack assembly 20 comprises a stack of annular laminations of magnetic material. The laminated stack is radially slotted to provide a plurality of radially inwardly extending poles. Windings 22 consist of copper wire coils wound on the laminated stack poles. Adjustment screw 21 is included for adjusting the positioning of stator 12.

In the preferred embodiment, rotor 14 has a core constructed of ferro-magnetic material, such as iron and copper and a rotor casting 23. Rotor 14 is supported in motor case 16 by a pair of frictionless bearing assemblies 24 such that rotor 14 is allowed to rotate within motor case 18 in a relatively frictionless manner.

VFFT 16 comprises an input winding 26 coupled to an output winding 28 by a transformer coupling created by a transducer rotor 30. Transducer rotor 30 is a brushless rotor connected to motor rotor 14 such that transducer rotor 30 rotates at the same angular velocity as motor rotor 14 providing VFFT 16 with frequency feedback from motor 10. In the preferred embodiment, input winding 26 receives a 2-phase, AC input of predetermined frequency.

As shown in FIGS. 2A, 2B and 2C, input winding 26 and output winding 28 form three winding elements 32, 34 and 36. Winding elements 32, 34 and 36 produce the AC, 3-phase stator input of the preferred embodiment, with each element producing one phase of the 3-phase signal. FIG. 2A illustrates the winding arrangement for producing the first phase of the 3-phase stator input. As shown in FIG. 2A, winding element 32 comprises winding inputs 1A and 1B and winding output 1. Winding inputs 1A and 1B provide the 2-phase, AC input of predetermined frequency with each winding input providing one phase of the 2-phase input. Winding output 1 provides the first phase of the 3-phase stator input. Transducer rotor 30 creates a transformer coupling between winding inputs 1A, 1B and winding output 1.

Similarly, inputs 2A, 2B, 3A and 3B provide the 2-phase, AC input of predetermined frequency for elements 34 and 36 respectively. Outputs 2 and 3 provide the second and third phases of the 3-phase stator input, respectively. Transducer rotor 30 creates a transformer coupling between winding inputs 2A, 2B and winding output 2 and between winding inputs 3A, 3B and winding output 3.

The output produced by output winding 28 comprises a combination of the AC input of predetermined frequency and a signal produced by the rotation of transducer rotor 30. Since transducer rotor 30 is directly tied to motor rotor 14, the signal produced by the rotation of transducer rotor 30 is related to the state of motor 10 in that it reflects the speed of rotation of motor rotor 14. Thus, the output produced by output windings 28 varies with variations of the speed of rotation of motor rotor 14, yet it maintains a constant absolute frequency difference between the motor rotor and magnetic field frequencies.

As shown in FIG. 3, in the preferred embodiment, predetermined frequency inputs 1A, 2A and 3A have a phase angle of 0° and inputs 1B, 2B and 3B have a phase angle of 90° to form the 2-phase, predetermined frequency AC input. Variable frequency output 1 has a phase angle of 0°, output 2 has a phase angle of 120° and output 3 has a phase angle of 240° to form the variable frequency, 3-phase, AC stator input.

In operation, input winding 26 is excited with an AC voltage of predetermined frequency. Transducer rotor 30 creates a transformer coupling from input winding 26 to output winding 28. The output of output winding 28 is amplified by an amplifier (not shown) and fed as an input to stator windings 22 creating a rotating magnetic field. Preferably, the stator input is a 3-phase AC input. Alternatively, the input can be a 2-phase AC input. The rotating magnetic field induces an EMF on the motor rotor core which, in turn, generates a current in rotor 14. The current interacts with the magnetic field to produce a torque which rotates rotor 14.

Depending on the input phase relationship of VFFT 16 and the direction of initial motor rotor 14 rotation, an additive or subtractive frequency change is created in input winding 26 with respect to output winding 28. This variable frequency will always have a constant absolute frequency difference with the magnetic field frequency since transducer rotor 30 is coupled directly to motor rotor 14. Thus, the slip frequency (i.e. the frequency difference between the motor rotor frequency and the magnetic field frequency) is maintained constant to provide optimum motor efficiency and performance.

If the frequency of the output winding signal is higher than the torque on motor rotor 14, the torque generated will be in one directional sense (either clockwise or counterclockwise), and if the frequency of the output winding signal is lower than the torque on motor rotor 14, the torque generated will be in the opposite direction. The torque direction is determined regardless of the direction of motor rotor rotation, thus the motor acceleration is controlled by the VFFT input phase relationship. Additionally, the VFFT input frequency can be varied, causing a change in the frequency difference between the motor rotor frequency and magnetic field frequency, and allowing adjustment of the slip frequency for peak efficiency or optimization of other parameters.

In the foregoing specification, the present invention has been described with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A variable frequency feedback transducer for producing a variable frequency output signal based on feedback from a motor having a rotor and a stator, the feedback transducer comprising:

an input winding excitable by an input AC voltage of predetermined frequency;

a transducer rotor operably connected to the motor rotor wherein said transducer rotor is configured to rotate with the motor rotor to provide motor feedback to the feedback transducer; and an output winding coupled to said input winding by a transformer coupling created by said transducer rotor, said output winding configured to provide an output signal, said output signal being fed to the motor stator to supply power to the motor stator creating a rotating magnetic field which induces current in the motor rotor causing a torque to be applied onto the motor rotor, thus causing the motor rotor to rotate in an initial direction;

wherein the phase relationship between said input AC voltage and the initial direction of rotation of the motor rotor creates an additive or subtractive frequency change in said output winding with respect to said input winding causing the frequency of said output signal to vary with variation in rotational speed of the motor rotor, such that the frequency of said output signal varies as the speed of rotation of the motor rotor varies maintaining a constant absolute frequency difference between the frequency of rotation of the motor rotor and the frequency of rotation of said rotating magnetic field.

2. A feedback transducer according to claim 1 wherein said output signal is amplified by an amplifier before being fed to the motor stator.

3. A feedback transducer according to claim 1 wherein the frequency of said input AC voltage is variable for adjusting said phase relationship to optimize motor performance.

4. A feedback transducer according to claim 1 wherein said transducer rotor is brushless.

5. A feedback transducer according to claim 1 wherein said input winding is two phase.

6. A feedback transducer according to claim 1 wherein said output winding is two phase.

7. A feedback transducer according to claim 1 wherein said output winding is three phase.

8. A slip controlled induction motor comprising:

a motor stator having a stator winding;

a motor rotor rotatable around a transverse axis;

a variable frequency feedback transducer having;

an input winding excitable by an input AC voltage of predetermined frequency;

a transducer rotor operably connected to said motor rotor wherein said transducer rotor is configured to rotate with said motor rotor to provide motor feedback to said feedback transducer; and an output winding coupled to said input winding by a transformer coupling created by said transducer rotor, said output winding configured to provide an output current which supplies power to said stator winding creating a rotating magnetic field which induces current in said motor rotor causing a torque to be applied onto said motor rotor, thus causing said motor rotor to rotate in an initial direction;

wherein the phase relationship between said input AC voltage and said initial direction of rotation of said motor rotor creates an additive or subtractive frequency change in said output winding with respect to said input winding, such that the frequency of said output current varies as the speed of rotation of the motor rotor varies maintaining a constant absolute frequency difference between the frequency of rotation of the motor rotor and the frequency of rotation of said rotating magnetic field.

9. A slip controlled induction motor according to claim 8 further comprising an amplifier for amplifying said output current.

10. A slip controlled induction motor according to claim 8 wherein the frequency of said input AC voltage is variable for adjusting said phase relationship to optimize motor performance.

11. A slip controlled induction motor according to claim 8 wherein said transducer rotor is brushless.

12. A slip controlled induction motor according to claim 8 wherein said input winding is two phase.

13. A slip controlled induction motor according to claim 8 wherein said output winding is two phase.

14. A slip controlled induction motor according to claim 13 wherein said stator winding is two phase.

15. A slip controlled induction motor according to claim 8 wherein said output winding is three phase.

16. A slip controlled induction motor according to claim 15 wherein said stator winding is three phase.

17. A method for controlling the torque in a slip controlled induction motor having a stator, rotor, and variable frequency feedback transducer, said feedback transducer comprising an input winding, a transducer rotor configured to rotate with the motor rotor and an output winding coupled to the input winding by a transformer coupling created by the transducer rotor, the method comprising the steps of:

providing an AC input voltage of predetermined frequency to the input winding;

combining the AC input voltage with a signal produced by the transducer rotor said signal being proportional to said transducer rotor rotational speed to create an additive or subtractive frequency change in the output winding with respect to the input winding;

providing a variable frequency input signal from the output winding to the stator based on said frequency change, wherein said variable frequency input signal maintains a constant frequency difference between the frequency of rotation of the motor rotor and the frequency of rotation of the magnetic field of the stator.

18. The method of claim 17 further comprising the step of optimizing the performance parameters of the motor by adjusting said AC input voltage causing a change in the frequency difference between the frequency of rotation of the motor rotor and the frequency of rotation of the magnetic field of the stator.

* * * * *